US012654507B2

(12) United States Patent
Kim et al.

(10) Patent No.: US 12,654,507 B2
(45) Date of Patent: Jun. 16, 2026

(54) APPARATUS FOR ADJUSTING VEHICLE HEIGHT

(71) Applicant: HL MANDO CORPORATION, Gyeonggi-do (KR)

(72) Inventors: Jeonggil Kim, Gyeonggi-do (KR); Woojin Jhong, Gyeonggi-do (KR); Kwangduk Baek, Gyeonggi-do (KR); Sungjoo Jung, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 19/206,098

(22) Filed: May 13, 2025

(65) Prior Publication Data

US 2025/0346088 A1 Nov. 13, 2025

(30) Foreign Application Priority Data

May 13, 2024 (KR) ........................ 10-2024-0062631
Feb. 13, 2025 (KR) ........................ 10-2025-0018656

(51) Int. Cl.
*B60G 17/04* (2006.01)
*B60G 17/056* (2006.01)

(52) U.S. Cl.
CPC ....... *B60G 17/0408* (2013.01); *B60G 17/056* (2013.01); *B60G 2500/30* (2013.01)

(58) Field of Classification Search
CPC .............. B60G 17/0408; B60G 17/056; B60G 2500/30
See application file for complete search history.

(56) References Cited

U.S. PATENT DOCUMENTS

| | | | | |
|---|---|---|---|---|
| 5,028,073 | A | * | 7/1991 | Harms ............... B60G 17/0157 280/5.514 |
| 8,408,561 | B2 | * | 4/2013 | Mochizuki ........... B60G 17/027 280/124.16 |
| 11,629,773 | B2 | * | 4/2023 | Murakami ........... B60G 11/265 188/266.5 |
| 2021/0048084 | A1 | * | 2/2021 | Murakami ................ F16F 9/46 |
| 2021/0061043 | A1 | * | 3/2021 | Yun ..................... B60G 17/0565 |
| 2021/0061044 | A1 | * | 3/2021 | Park ................... B60G 17/0157 |
| 2025/0135827 | A1 | * | 5/2025 | Kim ........................ B60G 17/08 |

FOREIGN PATENT DOCUMENTS

KR          10-2659190          4/2024

* cited by examiner

*Primary Examiner* — Toan C To
(74) *Attorney, Agent, or Firm* — WOMBLE BOND DICKINSON (US) LLP

(57) ABSTRACT

An apparatus for adjusting vehicle height is disclosed. The apparatus for adjusting vehicle height, may include a pump configured to supply or recover a fluid; and an actuator mounted between a chassis and a vehicle body of a vehicle, the actuator being configured to receive the fluid from the pump to raise the vehicle body and increase the vehicle height, or to lower the vehicle body and decrease the vehicle height as the fluid is recovered by the pump.

19 Claims, 9 Drawing Sheets

1 : 100, 200, 300
2 : 21, 22, 23

APPARATUS FOR ADJUSTING VEHICLE HEIGHT

CROSS-REFERENCE TO RELATED APPLICATION

This application claims priority to and benefit from Korean Patent Applications No. 10-2024-0062631, filed on May 13, 2024, No. 10-2025-0018656, filed on Feb. 13, 2025, the disclosures of which are incorporated herein by reference in their entirety.

TECHNICAL FIELD

The present disclosure relates to an apparatus for adjusting vehicle height, and more particularly, to an apparatus for adjusting vehicle height by changing the distance between a chassis and a vehicle body.

RELATED ART

An apparatus for adjusting vehicle height adjusts the vehicle height by controlling the distance between a chassis, that is, an unsprung mass, and a vehicle body, that is, a sprung mass. By actively adjusting the vehicle height through the apparatus for adjusting vehicle height, the convenience of passenger boarding and alighting or cargo loading and unloading can be enhanced. In addition, by adjusting the vehicle height at each corner of the vehicle through the apparatus for adjusting vehicle height, the vehicle body may be maintained in a horizontal state.

For the apparatus for adjusting vehicle height to be widely applied to vehicles, weight reduction and size reduction are required. To this end, the structure of the apparatus for adjusting vehicle height needs to be simplified. In addition, it is required to develop a structure that can be universally installed regardless of the type of vehicle.

SUMMARY

The present disclosure is directed to providing an apparatus for adjusting vehicle height that efficiently achieves an increase in vehicle height through actuating fluid or a decrease in vehicle height by the own weight of the vehicle using a simple structure.

The present disclosure is also directed to providing an apparatus for adjusting vehicle height that offers a high degree of freedom in installation within the vehicle.

The objects of the present disclosure are not limited to the above-described objects, and other objects that are not mentioned will be able to be clearly understood by those skilled in the art to which the present disclosure pertains from the following description.

According to an aspect of the present disclosure, provided is an apparatus for adjusting vehicle height, including a pump configured to supply or recover a fluid; and an actuator mounted between a chassis and a vehicle body of a vehicle, the actuator being configured to receive the fluid from the pump to raise the vehicle body and increase the vehicle height, or to lower the vehicle body and decrease the vehicle height as the fluid is recovered by the pump.

The apparatus for adjusting vehicle height according to an aspect of the present disclosure may further include a hydraulic line connecting the pump and the actuator, the hydraulic line being configured to allow the fluid to flow between the pump and the actuator.

In the apparatus for adjusting vehicle height according to an aspect of the present disclosure, the pump may include a motor configured to rotate in a forward or reverse direction; a spindle configured to rotate in the forward or reverse direction according to the forward or reverse rotation of the motor; a spindle nut through which the spindle is coupled, the spindle nut being configured to move forward when the spindle rotates in the forward direction and to move backward when the spindle rotates in the reverse direction; and a piston mounted in contact with the spindle nut and configured to move forward or backward together with the spindle nut.

In the apparatus for adjusting vehicle height according to an aspect of the present disclosure, the piston may supply the fluid to the actuator while moving forward, and recover the fluid into the pump while moving backward.

In the apparatus for adjusting vehicle height according to an aspect of the present disclosure, an output shaft of the motor and a forward/backward direction of the piston may be arranged in parallel with each other.

In the apparatus for adjusting vehicle height according to an aspect of the present disclosure, the pump may further include a main housing in which the motor is mounted; and a pump chamber housing in which the piston is disposed, the pump chamber housing defining a pump chamber configured to accommodate the fluid and being coupled to the main housing.

In the apparatus for adjusting vehicle height according to an aspect of the present disclosure, the pump chamber housing may include a pump chamber housing body that defines the pump chamber, and a pump chamber housing extension protruding outward from an outer surface of the pump chamber housing body, and the main housing and the pump chamber housing may be coupled to each other by a fastening member inserted into the pump chamber housing extension through the main housing.

In the apparatus for adjusting vehicle height according to an aspect of the present disclosure, the pump may further include an insert housing coupled to the main housing, the insert housing being disposed in contact with an outer surface of the spindle nut inside the pump chamber housing, and configured to define a backward movement limit of the piston by contacting one surface of the piston at a maximum backward position of the spindle nut.

In the apparatus for adjusting vehicle height according to an aspect of the present disclosure, the insert housing may include a cylindrical insert housing body inserted into the pump chamber housing, and an insert housing extension protruding outward from an outer surface of the insert housing body and disposed outside the pump chamber housing, and the main housing and the insert housing may be coupled to each other by a fastening member inserted into the insert housing through the main housing.

In the apparatus for adjusting vehicle height according to an aspect of the present disclosure, the actuator may include an outer tube having one open end; an inner tube inserted into the outer tube through the open end of the outer tube; and a fixed piston fixed to the outer tube and disposed inside the inner tube, the fixed piston and an inner wall of the inner tube together defining an actuating chamber.

In the apparatus for adjusting vehicle height according to an aspect of the present disclosure, when the fluid is supplied into the actuating chamber, the volume of the actuating chamber may increase due to the fluid, and the inner tube may be drawn outward from the outer tube to increase the vehicle height; and when the fluid flows from the actuating chamber toward the pump, the volume of the actuating chamber may decrease, and the inner tube may be inserted into the outer tube to decrease the vehicle height.

In the apparatus for adjusting vehicle height according to an aspect of the present disclosure, the fixed piston may include a fixed piston head having an outer diameter corresponding to an inner diameter of the actuating chamber and disposed in contact with an inner wall of the inner tube; and a fixed piston body having a smaller outer diameter than the fixed piston head, the fixed piston body being connected to the fixed piston head, extending inside the inner tube, and fixed to the outer tube.

In the apparatus for adjusting vehicle height according to an aspect of the present disclosure, an inner tube groove may be recessed in the inner circumferential surface of the inner tube, and the apparatus for adjusting vehicle height according to an aspect of the present disclosure may further include an inner tube stopper inserted into the inner tube groove, the inner tube stopper being configured to be caught by the fixed piston head when the inner tube is drawn outward from the outer tube, thereby defining a withdrawal limit of the inner tube.

In the apparatus for adjusting vehicle height according to an aspect of the present disclosure, the inner tube may include a tubular inner tube body inserted into an inner side of the outer tube, and an inner tube flange extending radially outward from one end of the inner tube body, the inner tube flange being configured to contact the outer tube when the inner tube is inserted into the outer tube, thereby defining an insertion limit of the inner tube.

In the apparatus for adjusting vehicle height according to an aspect of the present disclosure, an inner tube inlet/outlet passage may be formed in the inner tube flange to allow communication between an interior of the inner tube body and the pump.

In the apparatus for adjusting vehicle height according to an aspect of the present disclosure, the outer tube may include an outer tube body having one open end into which the inner tube is inserted, and an outer tube flange extending radially outward from one end of the outer tube body.

In the apparatus for adjusting vehicle height according to an aspect of the present disclosure, an outer tube groove may be recessed in the inner circumferential surface of the outer tube, and the apparatus for adjusting vehicle height according to an aspect of the present disclosure may further include a reinforcement member inserted into the outer tube groove, the reinforcement member being configured to guide movement of the inner tube within the outer tube and to provide resistance to lateral external forces.

In the radar device according to an aspect of the present disclosure, the reinforcement member may have a ring shape.

According to another aspect of the present disclosure, provided is an apparatus for adjusting vehicle height, including a pump including a bidirectionally rotatable motor and a piston configured to move forward or backward within a pump chamber according to rotation of the motor, the piston being configured to pressurize fluid disposed in the pump chamber toward the outside or to draw fluid from the outside into the pump chamber; and an actuator mounted between a chassis and a vehicle body of a vehicle, the actuator being configured to receive the fluid from the pump to raise the vehicle body and increase the vehicle height, or to lower the vehicle body and decrease the vehicle height as the fluid is recovered by the pump, wherein the actuator includes an outer tube having one open end; an inner tube inserted into the outer tube through the open end of the outer tube; and a fixed piston fixed to the outer tube and disposed inside the inner tube, the fixed piston and an inner wall of the inner tube together defining an actuating chamber.

In the apparatus for adjusting vehicle height according to another aspect of the present disclosure, an output shaft of the motor and a forward/backward direction of the piston may be arranged in parallel with each other.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
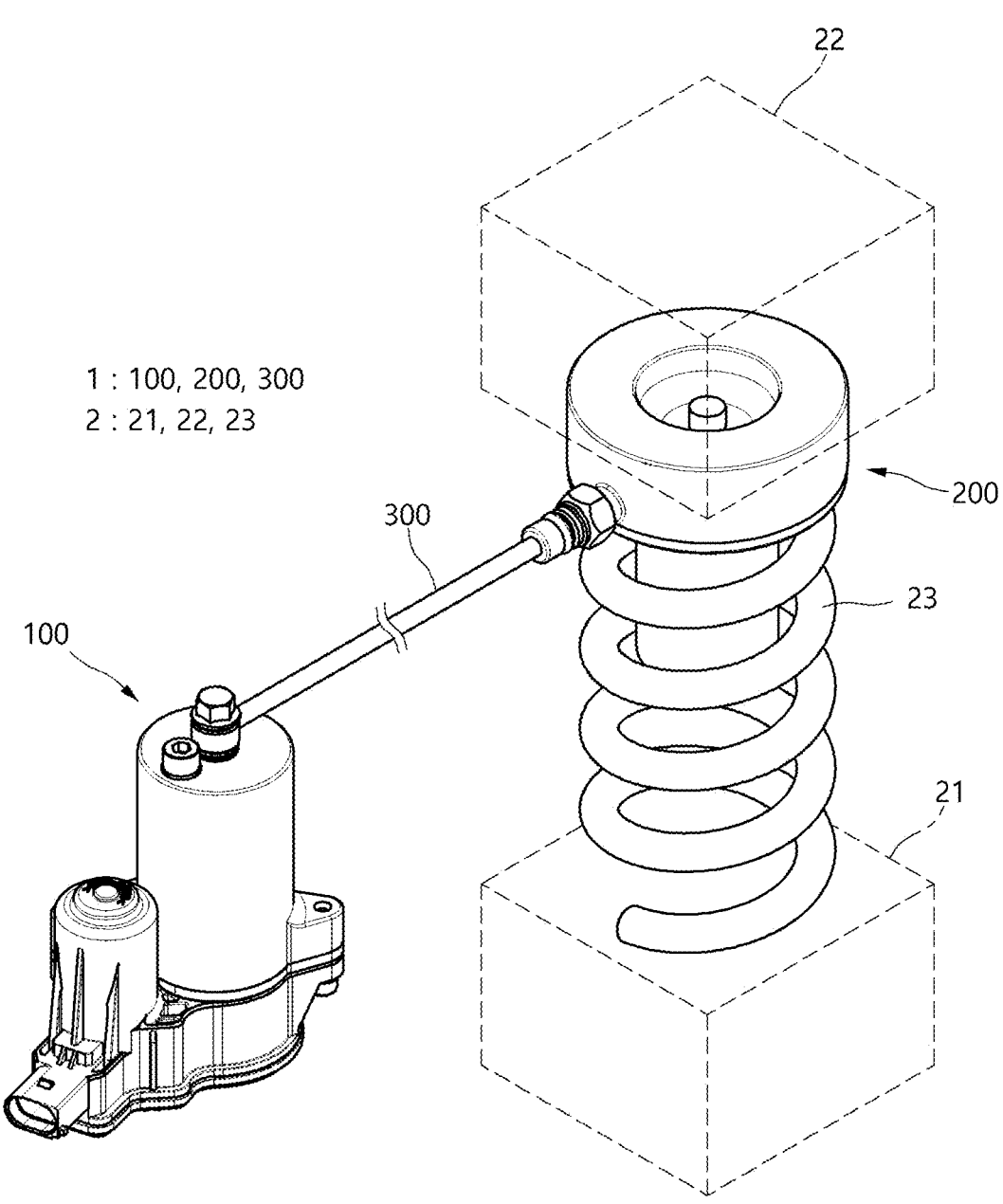
FIG. 1 is a diagram illustrating a configuration of an apparatus for adjusting vehicle height according to an exemplary embodiment of the present disclosure.

Hereinafter, embodiments of the present disclosure will be described in detail so that those skilled in the art to which the present disclosure pertains can easily carry out the embodiments. The present disclosure may be implemented in many different forms and is not limited to the embodiments described herein. In order to clearly describe the present disclosure, portions not related to the description are omitted from the accompanying drawings, and the same or similar components are denoted by the same reference numerals throughout the specification.

The words and terms used in the specification and the claims are not limitedly construed as their ordinary or dictionary meanings, and should be construed as meaning and concept consistent with the technical spirit of the present disclosure in accordance with the principle that the inventors can define terms and concepts in order to best describe their disclosure.

In the specification, it should be understood that the terms such as "comprise" or "have" are intended to specify the presence of features, numbers, steps, operations, components, parts, or combinations thereof described in the specification and do not preclude the possibility of the presence or addition of one or more other features, numbers, steps, operations, components, parts, or combinations thereof.

FIG. 1 is a diagram illustrating a configuration of an apparatus for adjusting vehicle height according to an exemplary embodiment of the present disclosure.

An apparatus for adjusting vehicle height 1 according to an exemplary embodiment of the present disclosure is installed in a vehicle 2 to adjust the vehicle height. The apparatus for adjusting vehicle height 1 may be individually installed at each wheel of the vehicle. In other words, the apparatus for adjusting vehicle height 1 may be installed at each corner of the vehicle 2 to independently adjust the vehicle height at each corner of the vehicle 2.

The apparatus for adjusting vehicle height 1 may adjust the vehicle height by adjusting a distance between a chassis 21 of the vehicle 2, that is, an unsprung mass, and a vehicle body 22, that is, a sprung mass. More specifically, the apparatus for adjusting vehicle height 1 may raise the vehicle height by increasing the distance between the chassis 21 and the vehicle body 22. In addition, the apparatus for adjusting vehicle height 1 may lower the vehicle height by decreasing the distance between the chassis 21 and the vehicle body 22.

Meanwhile, a suspension 23 may be disposed between the chassis 21 and the vehicle body 22. The apparatus for adjusting vehicle height 1 may tension or compress the suspension 23 in the process of actively adjusting the vehicle height.

Referring to FIG. 1, the apparatus for adjusting vehicle height 1 may include a pump 100, an actuator 200, and a hydraulic line 300.

The pump 100 supplies or recovers fluid. The fluid serves as a medium for raising or lowering the vehicle height. The pump 100 may supply the fluid to the actuator 200 or recover the fluid from the actuator 200.

The pump 100 may operate bidirectionally. In other words, the pump 100 may operate in one direction to supply the fluid to the actuator 200, or operate in the other direction to recover the fluid from the actuator 200.

Figure 2:
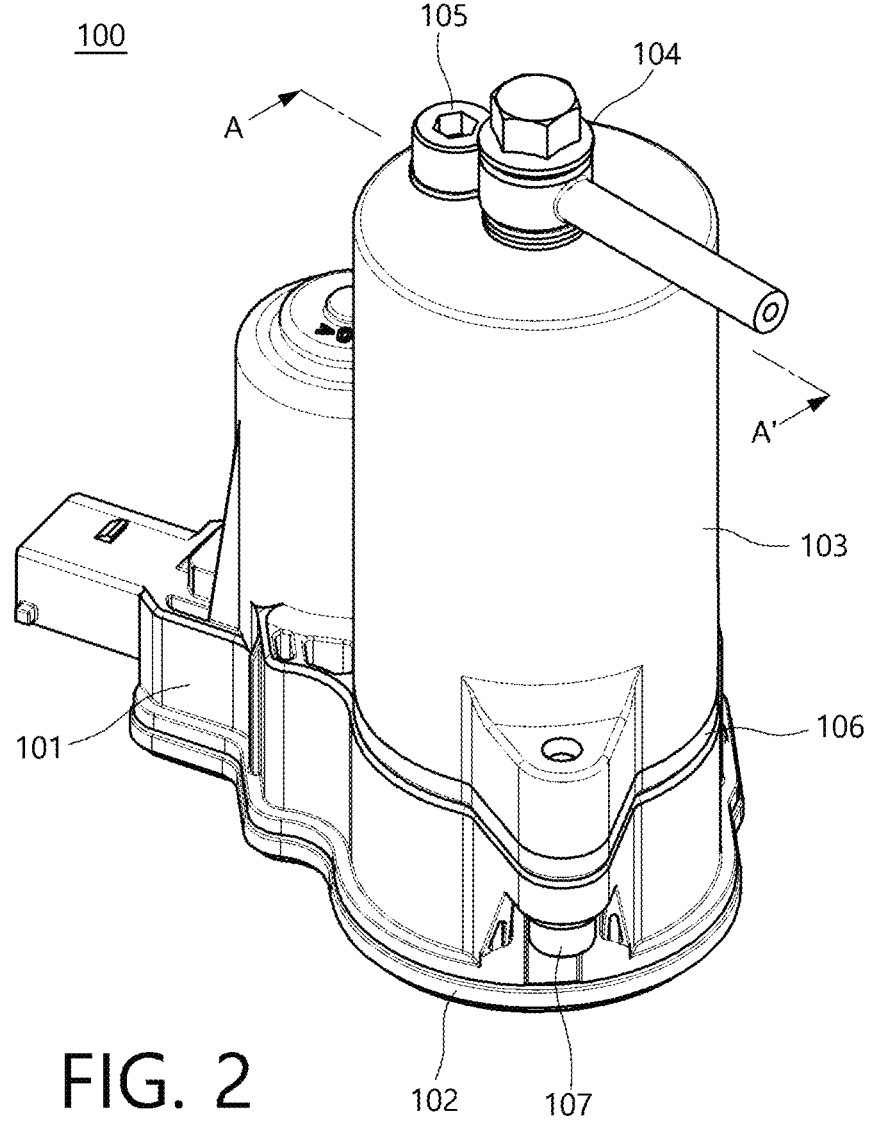
FIG. 2 is a perspective view of a pump of the apparatus for adjusting vehicle height according to an exemplary embodiment of the present disclosure.
Figure 3:
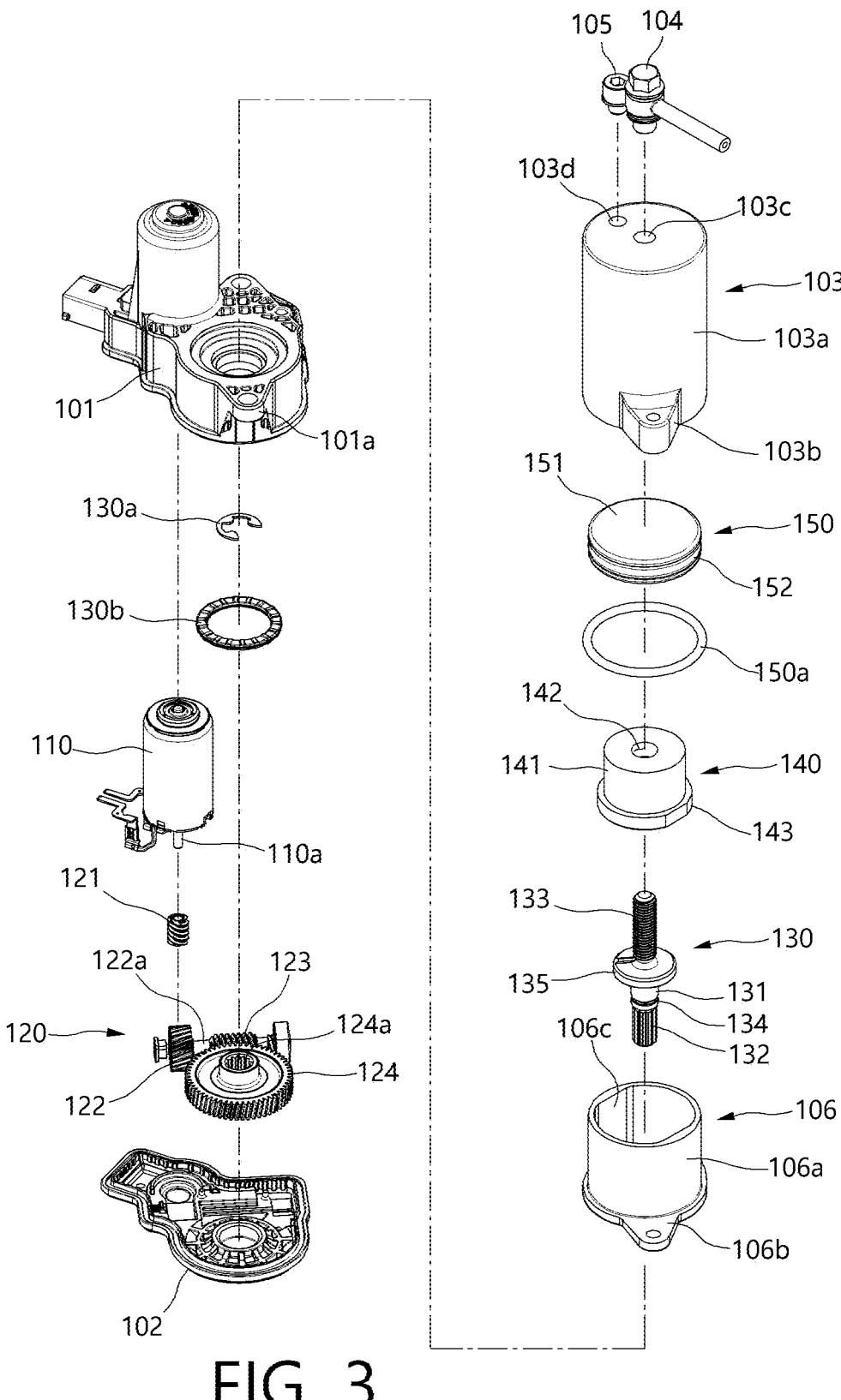
FIG. 3 is an exploded perspective view of a pump of the apparatus for adjusting vehicle height according to an exemplary embodiment of the present disclosure.

FIG. 2 is a perspective view of a pump of the apparatus for adjusting vehicle height according to an exemplary embodiment of the present disclosure. In addition, FIG. 3 is an exploded perspective view of a pump of the apparatus for adjusting vehicle height according to an exemplary embodiment of the present disclosure. In addition, FIG. 4 is a cross-sectional view taken along line A-A' of FIG. 2.

Figure 4:
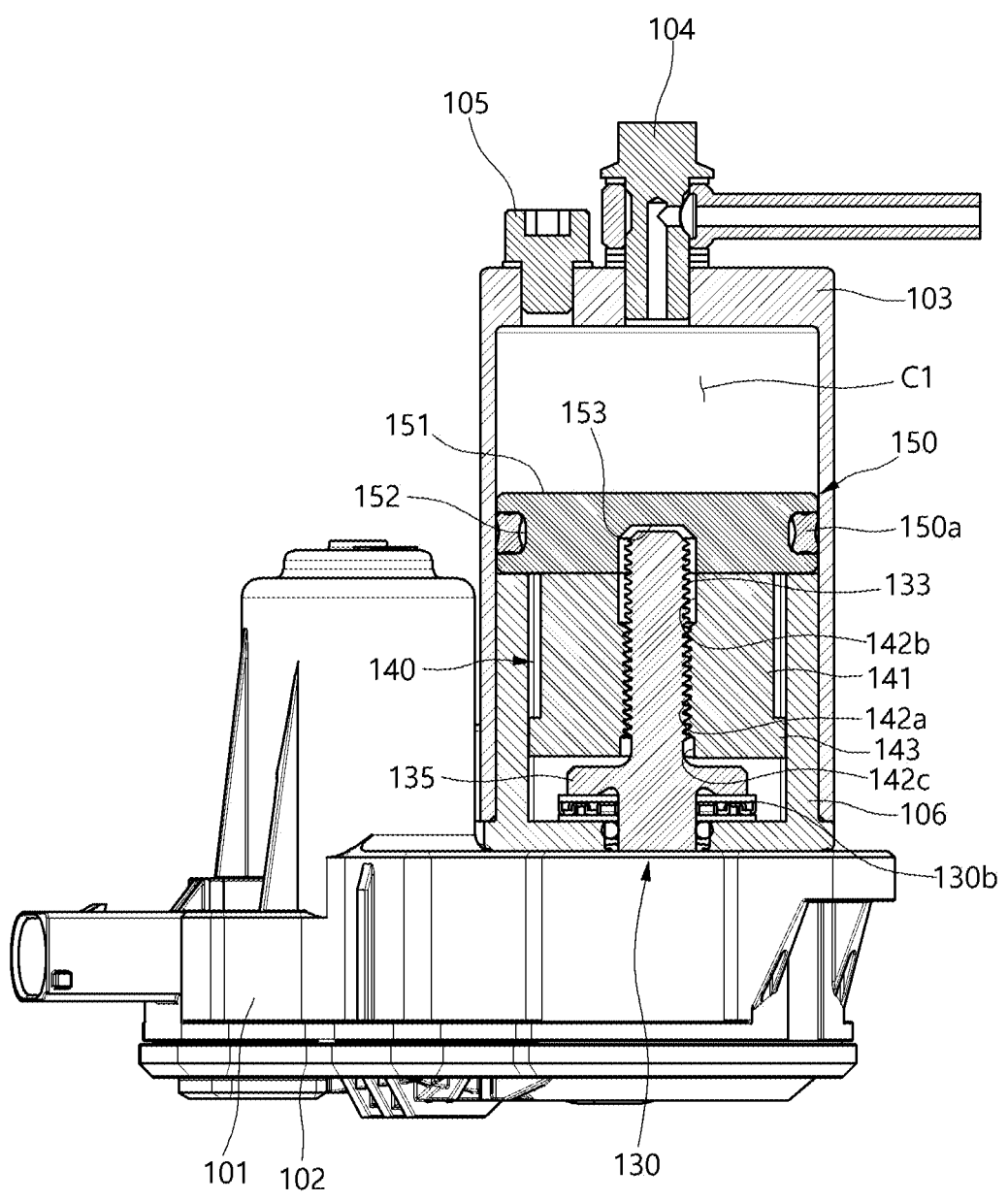
FIG. 4 is a cross-sectional view taken along line A-A' of FIG. 2.

Referring to FIGS. 2 to 4, the pump 100 includes a motor 110, a gear 120, a spindle 130, a spindle nut 140, and a piston 150.

The motor 110 may rotate in a forward direction or a reverse direction. That is, the motor 110 is capable of rotating in both directions. The rotational force of the motor 110 is transmitted to the outside through an output shaft 110$a$ of the motor 110.

The gear 120 transmits the rotational force of the motor 110 to the spindle 130. Through the gear 120, deceleration is achieved and torque can be increased.

The gear 120 may include a first worm 121 coupled to the output shaft 110$a$ of the motor 110 and rotating in a forward or reverse direction according to the forward or reverse rotation of the motor 110, a first worm wheel 122 engaged with the first worm 121 to rotate, a second worm 123 disposed on a rotation shaft 122$a$ of the first worm wheel 122 to rotate together with the first worm wheel 122, and a second worm wheel 124 engaged with the second worm 123 to rotate.

The first worm 121, the first worm wheel 122, the second worm 123, and the second worm wheel 124 may be arranged such that a rotation axis of the first worm 121 is parallel to a rotation axis of the second worm wheel 124. The rotation axis of the first worm 121 is the same as the output shaft 110$a$ of the motor 110, and the rotation axis of the second worm wheel 124 serves as the rotation axis of the spindle 130. In other words, the output shaft 110$a$ of the motor 110 and the rotation axis of the spindle 130 may be arranged in parallel.

The second worm wheel 124 may include a serration hole 124$a$ formed through an axial center thereof and having serrations formed in the inner circumferential surface. The spindle 130 may be fitted into the serration hole 124$a$.

The spindle 130 rotates in a forward or reverse direction according to the forward or reverse rotation of the motor 110. One end of the spindle 130 is coupled to the gear 120, and the other end of the spindle 130 is coupled to the spindle nut 140.

Referring to FIGS. 3 and 4, the spindle 130 may include a spindle body 131 extending from one end to the other end, serrations 132 provided on the outer circumferential surface of one end of the spindle body 131 to be engaged with the serration hole 124$a$, and threads 133 formed over a predetermined section at the other end of the spindle body 131. The spindle nut 140 is engaged with the threads 133.

The spindle 130 may have a spindle groove 134 formed by the outer circumferential surface of the spindle body 131 being recessed between the serrations 132 and the threads 133. The spindle groove 134 may be formed along the circumferential direction of the spindle body 131.

A spindle stopper 130$a$ for restricting axial movement of the spindle 130 may be disposed in the spindle groove 134. The spindle stopper 130$a$ may restrict axial movement of the spindle 130 by having a portion inserted into the spindle groove 134 while being fixed to a main housing 101, which will be described later.

The spindle 130 may further have a spindle flange 135 protruding outward from the outer circumferential surface of the spindle body 131 between the serrations 132 and the threads 133. The spindle flange 135 may restrict the movement of the spindle nut 140. In addition, the spindle flange 135 may increase the rigidity of the spindle 130.

A bearing 130$b$ for supporting the rotation of the spindle 130 may be disposed inside the pump 100. For example, the bearing 130$b$ may be disposed adjacent to the spindle flange 135.

The spindle nut 140 is coupled to the spindle 130 and moves forward or backward according to the rotation of the spindle 130. The spindle 130 is inserted through and coupled along an axial center of the spindle nut 140, and the spindle nut 140 may move forward when the spindle 130 rotates in a forward direction and move backward when the spindle 130 rotates in a reverse direction.

Here, the forward direction refers to a direction in which the spindle nut 140 pushes a piston 150 so that the piston 150 pressurizes the fluid to the outside of the pump 100, and the backward direction refers to the opposite direction.

Referring to FIGS. 3 and 4, the spindle nut 140 includes a cylindrical spindle nut body 141 having a through hole 142 formed along an axial center thereof. At least a portion of the inner circumferential surface of the through hole 142 is provided with corresponding threads 142$a$ that can be engaged with the threads 133 of the spindle 130.

In an exemplary embodiment of the present disclosure, the length of the portion of the through hole 142 of the spindle nut 140 in which the corresponding threads 142$a$ are formed is shorter than the length of the portion of the spindle 130 in which the threads 133 are formed. In addition, a first non-engaging portion 142b that does not engage with the threads 133 of the spindle 130 may be formed in a predetermined front section of the through hole 142.

Such a configuration allows the engagement force and frictional force between the spindle 130 and the spindle nut 140 to be appropriately adjusted. As a result, linear displacement (forward or backward) of the spindle nut 140 may be smoothly achieved during rotation of the spindle 130.

A second non-engaging portion 142c that does not engage with the threads 133 of the spindle 130 may be formed in a rear end section of the through hole 142 of the spindle nut 140. The spindle 130 and the spindle nut 140 are fastened by allowing the threaded end 133 of the spindle 130 to enter through the rear of the through hole 142 of the spindle nut 140, and the second non-engaging portion 142c allows the threaded end 133 of the spindle 130 to be easily inserted into the through hole 142 during assembly of the spindle 130 and the spindle nut 140.

The spindle nut 140 may further include a spindle nut protrusion 143 protruding outward from the outer circumferential surface of the spindle nut body 141. In an exemplary embodiment of the present disclosure, the spindle nut protrusion 143 may be provided at a rear end of the spindle nut body 141. For example, the spindle nut protrusion 143 may be formed as a flange having a chamfered portion on an outer periphery.

The piston 150 is disposed in contact with the spindle nut 140 and moves forward or backward together with the spindle nut 140. The piston 150 may be disposed in contact with a front end of the spindle nut 140.

Here, the forward direction of the piston 150 refers to the direction in which the piston 150 pressurizes the fluid to the outside of the pump 100. In addition, the backward direction of the piston 150 refers to a direction opposite to the forward direction. In other words, the piston 150 may supply the fluid to the actuator 200 while moving forward, and may recover the fluid into the pump 100 while moving backward.

In an exemplary embodiment of the present disclosure, the piston 150 may not be coupled to the spindle nut 140 and may be disposed in contact with a front end of the spindle nut 140 so as to be pushed forward by the spindle nut 140 when the spindle nut 140 moves forward. Such a structure facilitates the manufacturing of the spindle nut 140 and the piston 150, and can also improve the assembly efficiency of the pump 100.

Referring to FIGS. 3 and 4, the piston 150 may include a cylindrical piston body 151 and a piston groove 152 recessed in the outer circumferential surface of the piston body 151. The piston groove 152 may be formed along the circumferential direction of the piston body 151.

A rear surface of the piston body 151 is disposed in contact with the front of the spindle nut 140. In an exemplary embodiment of the present disclosure, the piston body 151 may have a larger diameter than the spindle nut 140. In addition, a first sealing member 150a may be disposed in the piston groove 152. For example, the first sealing member 150a may be an O-ring.

Referring to FIG. 4, a piston recess 153 recessed forward at a central axial portion may be provided on a rear surface of the piston body 151. When the spindle nut 140 is in a maximally retracted position, the threaded end 133 of the spindle 130 may pass through the through hole 142 of the spindle nut 140 and be disposed in the piston recess 153.

Such a structure improves spatial efficiency by reducing the height required for the arrangement of the spindle nut 140 and the piston 150.

As described above, the output shaft 110a of the motor 110 and the rotation axis of the spindle 130 may be arranged in parallel. From another perspective, the output shaft 110a of the motor 110 and the forward and backward movement direction of the piston 150 may be arranged in parallel with each other. Through such a structure, the length of the pump 100 can be reduced, and miniaturization of the pump 100 can be achieved.

The pump 100 includes a housing in which the motor 110, the gear 120, the spindle 130, the spindle nut 140, and the piston 150 are disposed. More specifically, the pump 100 may include a main housing 101 and a pump chamber housing 103.

The main housing 101 is provided to accommodate the motor 110 and the gear 120. For assemblability, the main housing 101 may have an open-ended structure on one surface. In this regard, a housing cover 102 may be disposed to cover the open one surface of the main housing 101.

The pump chamber housing 103 defines a pump chamber C1, in which the piston 150 is disposed and the fluid may be accommodated, and is coupled to the main housing 101.

The pump chamber housing 103 may include a pump chamber housing body 103a that defines the pump chamber C1, and a pump chamber housing extension 103b that protrudes outward from an outer surface of the pump chamber housing body 103a. The main housing 101 and the pump chamber housing 103 may be coupled to each other by a fastening member 107 that is inserted into the pump chamber housing extension 103b through the main housing 101. In this regard, the main housing 101 may have a main housing coupling part 101a through which the fastening member 107 passes.

A pump chamber connection hole 103c, which fluidly connects the pump chamber C1 to the hydraulic line 300, may be formed on an upper surface of the pump chamber housing body 103a. In addition, a pump inlet/outlet hole 103d may be formed on the upper surface of the pump chamber housing body 103a to allow fluid to be introduced or discharged when the hydraulic line 300 is connected.

An adapter 104 may be coupled to the pump chamber connection hole 103c to allow the hydraulic line 300 to communicate with the pump chamber C1. In addition, a pump cap 105 may be disposed to close the pump inlet/outlet hole 103d.

In an exemplary embodiment of the present disclosure, the pump 100 may further include an insert housing 106. The insert housing 106 is coupled to the main housing 101 and is disposed in contact with an outer surface of the spindle nut 140 inside the pump chamber housing 103. In addition, the insert housing 106 defines a retraction limit of the piston 150 by coming into contact with one surface of the piston 150 at a maximum retracted position of the spindle nut 140.

The insert housing 106 includes an insert housing body 106a having a cylindrical shape and inserted into the interior of the pump chamber housing 103, and an insert housing extension 106b protruding outward from an outer surface of the insert housing body 106a and disposed outside the pump chamber housing 103.

The insert housing 106 may be coupled by a fastening member 107 that is inserted into the insert housing 106 through the main housing 101. More specifically, the fastening member 107 may pass through the main housing coupling part 101a and the insert housing extension 106b, and be inserted into the pump chamber housing extension 103*b*, thereby coupling the main housing 101, the pump chamber housing 103, and the insert housing 106 together.

A flat portion 106*c* formed of a flat surface may be provided on the inner circumferential surface of the insert housing body 106*a*. As described above, the spindle nut protrusion 143 may be formed as a flange having a chamfered portion on its outer periphery, and the flat portion 106*c* is formed to correspond to the spindle nut protrusion 143 so as to come into contact with the spindle nut protrusion 143, thereby preventing the spindle nut 140 from rotating when the spindle 130 rotates and guiding the linear movement of the spindle nut 140.

The actuator 200 is disposed between the chassis 21 and the vehicle body 22 of the vehicle 2. For example, the actuator 200 may be disposed in a state of being inserted into a spring of the suspension 23.

The actuator 200 may receive the fluid from the pump 100 and lift the vehicle body 22 to increase the vehicle height. In addition, the actuator 200 may lower the vehicle body 22 as the fluid is returned to the pump 100, thereby decreasing the vehicle height.

Figure 5:
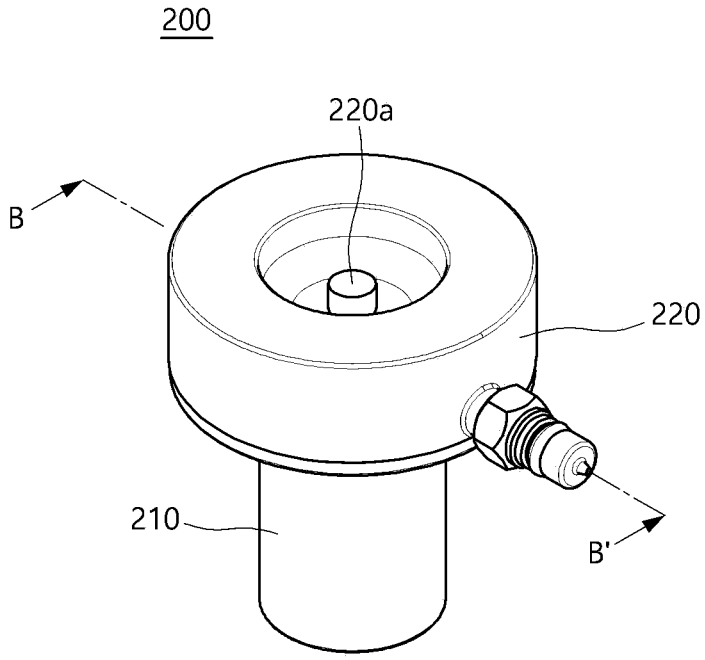
FIG. 5 is a perspective view of an actuator of the apparatus for adjusting vehicle height according to an exemplary embodiment of the present disclosure.
Figure 6:
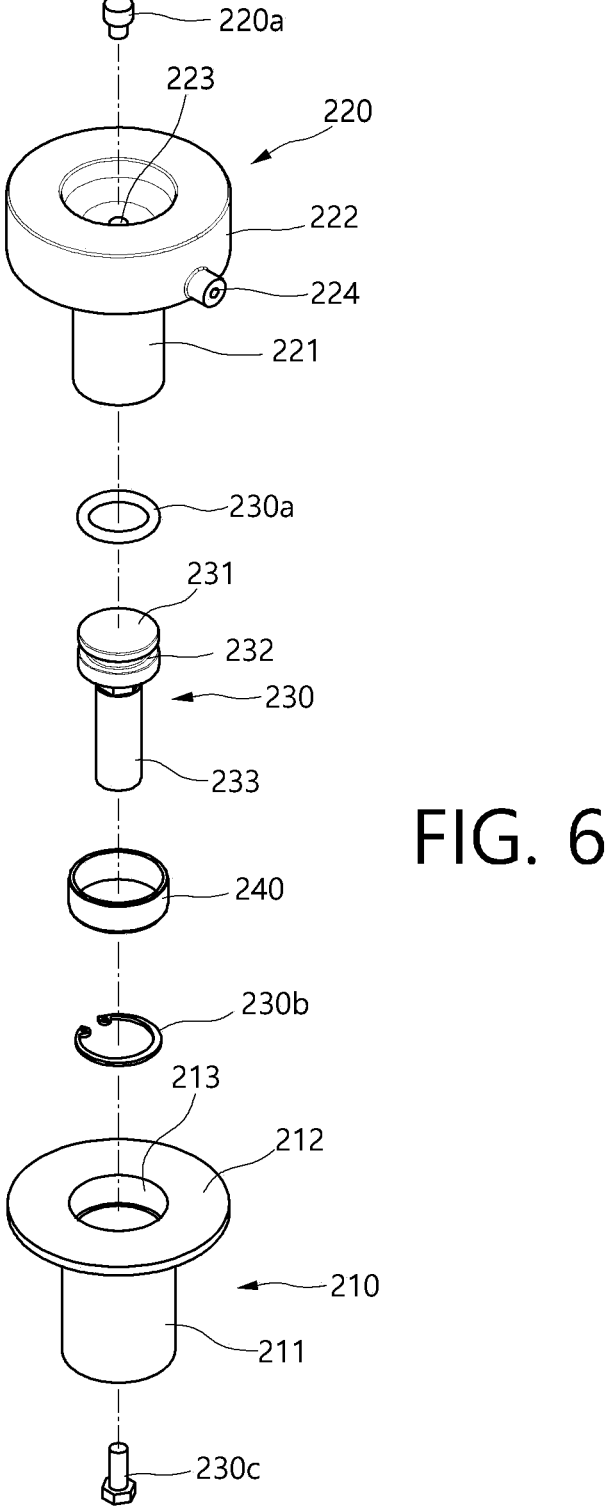
FIG. 6 is an exploded perspective view of an actuator of the apparatus for adjusting vehicle height according to an exemplary embodiment of the present disclosure.

FIG. 5 is a perspective view of an actuator of the apparatus for adjusting vehicle height according to an exemplary embodiment of the present disclosure. In addition, FIG. 6 is an exploded perspective view of an actuator of the apparatus for adjusting vehicle height according to an exemplary embodiment of the present disclosure. In addition, FIG. 7 is a cross-sectional view taken along line B-B' of FIG. 5.

Figure 7:
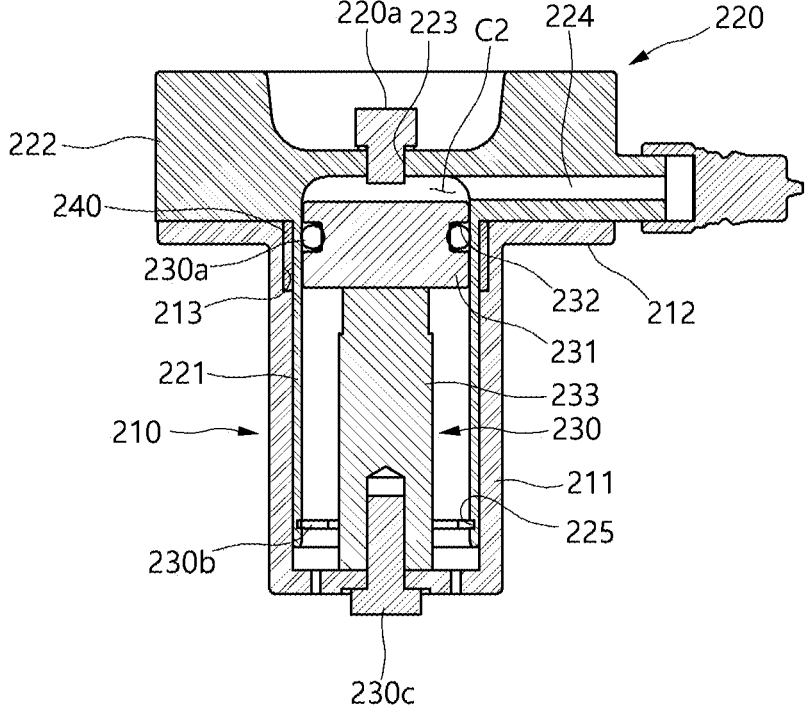
FIG. 7 is a cross-sectional view taken along line B-B' of FIG. 5.

Referring to FIGS. 5 to 7, the actuator 200 may include an outer tube 210, an inner tube 220, and a fixed piston 230.

One end of the outer tube 210 is open. The inner tube 220 may be inserted through the open end of the outer tube 210. The outer tube 210 is disposed to be displaceable relative to the inner tube 220. In other words, the outer tube 210 provides a passage through which the inner tube 220 can linearly displace.

The outer tube 210 may include an outer tube body 211 and an outer tube flange 212.

The outer tube body 211 is formed with one end open so that the inner tube 220 is inserted into the interior thereof. The other end of the outer tube body 211 may be closed.

The outer tube flange 212 extends radially outward from one end of the outer tube body 211. The outer tube flange 212 is laid over the suspension 23 of the vehicle, allowing the actuator 200 to be installed between the chassis 21 and the vehicle body 22. For example, the outer tube flange 212 may extend radially outward from an outer surface of the open end of the outer tube body 211.

For example, the outer tube 210 may be inserted into a spring of the suspension 23 and disposed therein. In this case, the outer tube body 211 is inserted into the interior of the spring of the suspension 23, and the outer tube flange 212 may be caught on an upper end of the spring to fix the outer tube 210 in place.

An outer tube groove 213 may be recessed in the inner circumferential surface of the outer tube 210. More specifically, the outer tube groove 213 may be formed in the inner circumferential surface of the open end portion of the outer tube body 211, from which the outer tube flange 212 extends.

A reinforcement member 240 may be disposed in the outer tube groove 213. The reinforcement member 240 is inserted into the outer tube groove 213 and guides the movement of the inner tube 220. In addition, the reinforcement member 240 provides resistance to external forces applied laterally to the actuator 200. For example, the reinforcement member 240 may have a ring shape.

The inner tube 220 is inserted into the outer tube 210 through the open end of the outer tube 210. The inner tube 220 is disposed to be displaceable relative to the outer tube 210. In other words, the inner tube 220 linearly displaces inside the outer tube 210.

The inner tube 220 may include an inner tube body 221 and an inner tube flange 222.

The inner tube body 221 is a tubular member inserted into the inner side of the outer tube 210. A passage formed inside the inner tube body 221 defines an actuating chamber C2 together with the fixed piston 230, as will be described later.

The inner tube body 221 may be in communication with the hydraulic line 300 at one end and may have an open form at the other end. In a state where the inner tube 220 is inserted into the outer tube 210, the open end of the inner tube body 221 may be closed by the fixed piston 230.

Meanwhile, an actuator inlet/outlet hole 223 may be formed at one end of the inner tube body 221 to introduce or discharge the fluid, even in a state in which the hydraulic line 300 is connected. In addition, an actuator cap 220*a* may be disposed to close the actuator inlet/outlet hole 223.

The inner tube flange 222 extends radially outward from one end of the inner tube body 221, comes into contact with the outer tube 210 when the inner tube 220 is inserted into the outer tube 210, and defines the insertion limit of the inner tube 220. More specifically, the inner tube flange 222 may be formed to extend outward from the outer surface of one end of the inner tube 220.

The inner tube flange 222 may come into contact with the outer tube flange 212 when the inner tube 220 is inserted into the outer tube 210 to the maximum insertion position. The inner tube flange 222 may have the same outer diameter as the outer tube flange 212 and may be disposed to overlap the outer tube flange 212 when the inner tube 220 is inserted into the outer tube 210 to the maximum insertion position.

An inner tube inlet/outlet passage 224 may be formed in the inner tube flange 222 to communicate the interior of the inner tube body 221 with the pump 100. The inner tube inlet/outlet passage 224 may communicate with the passage formed inside the inner tube body 221 and may be formed to extend across the inner tube flange 222 in the radial direction. The inner tube inlet/outlet passage 224 may be connected to the hydraulic line 300.

An inner tube groove 225 may be recessed in the inner circumferential surface of the inner tube 220. The inner tube groove 225 may be formed along the circumferential direction on the inner circumferential surface of the inner tube body 221 adjacent to the open end of the inner tube body 221.

An inner tube stopper 230*b*, which defines a withdrawal limit of the inner tube when the inner tube 220 is drawn outward from the outer tube 210, may be disposed in the inner tube groove 225.

The fixed piston 230 is fixed to the outer tube 210 and disposed inside the inner tube 220. Referring to FIG. 7, the fixed piston 230 defines the actuating chamber C2 together with an inner wall of the inner tube 210.

The fixed piston 230 may include a fixed piston head 231 and a fixed piston body 233. The fixed piston head 231 has an outer diameter corresponding to the inner diameter of the actuating chamber C2 and is disposed in contact with an inner wall of the inner tube 220. A fixed piston groove 232 may be formed in the outer circumferential surface of the fixed piston head 231. The fixed piston groove 232 may be formed along the circumferential direction of the fixed piston head 231.

In addition, a second sealing member 230a may be disposed in the fixed piston groove 232. For example, the second sealing member 230a may be an O-ring.

The fixed piston body 233 has a smaller outer diameter than the fixed piston head 231, is connected to the fixed piston head 231, and extends inside the inner tube 220. The fixed piston body 233 is fixed to the outer tube 210. One end of the fixed piston body 233 may contact a closed end of the passage of the outer tube 210, and the other end may be connected to the fixed piston head 231.

In an exemplary embodiment of the present disclosure, one end of the fixed piston body 233 may be disposed in contact with a closed end of an internal passage of the outer tube 210. The fixed piston 230 may be fixed by a piston fastening member 230c that penetrates the outer tube 210 and is inserted and secured into the fixed piston body 233.

When the fluid is introduced into the actuating chamber C2, the volume of the actuating chamber C2 increases, and the inner tube 220 is drawn outward from the outer tube 210 by the pressure of the fluid introduced into the actuating chamber C2.

As described above, an inner tube stopper 230b is disposed in the inner tube groove 225. When the inner tube 220 is drawn outward from the outer tube 210, the fixed piston head 231 may be caught by the inner tube stopper 230b, thereby stopping the withdrawal of the inner tube 220. That is, the withdrawal limit of the inner tube 220 may be defined by the inner tube stopper 230b.

The hydraulic line 300 connects the pump 100 and the actuator 200 to allow the fluid to flow between the pump 100 and the actuator 200. The pump 100 and the actuator 200 are spaced apart from each other in the vehicle and may be in fluid communication with each other through the hydraulic line 300. Accordingly, the degree of freedom in installing the apparatus for adjusting vehicle height 1 may be improved. For example, the hydraulic line 300 may include a flexible hose.

Alternatively, the pump 100 and the actuator 200 may be disposed adjacent to each other, and the hydraulic line 300 may be implemented through passages provided in the pump 100 and the actuator 200.

As described above, the configuration of the apparatus for adjusting vehicle height 1 according to an exemplary embodiment of the present disclosure has been described in detail. Hereinafter, the operation of the apparatus for adjusting vehicle height 1 will be described.

Figure 8:
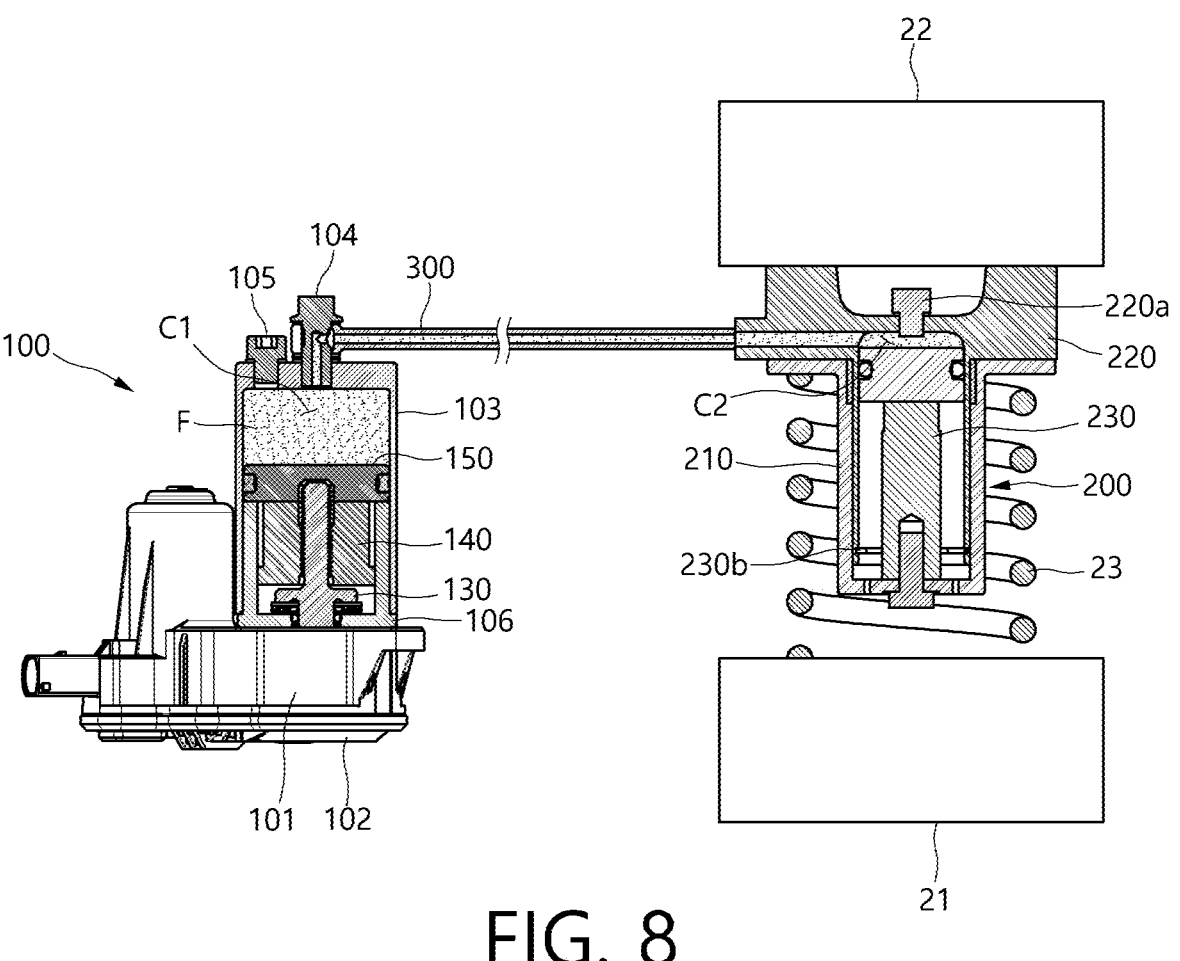
FIG. 8 is a view illustrating a state in which the apparatus for adjusting vehicle height lowers the vehicle height according to an exemplary embodiment of the present disclosure.

FIG. 8 is a view illustrating a state in which the apparatus for adjusting vehicle height lowers the vehicle height according to an exemplary embodiment of the present disclosure. In addition, FIG. 9 is a view illustrating a state in which the apparatus for adjusting vehicle height raises the vehicle height according to an exemplary embodiment of the present disclosure.

Figure 9:
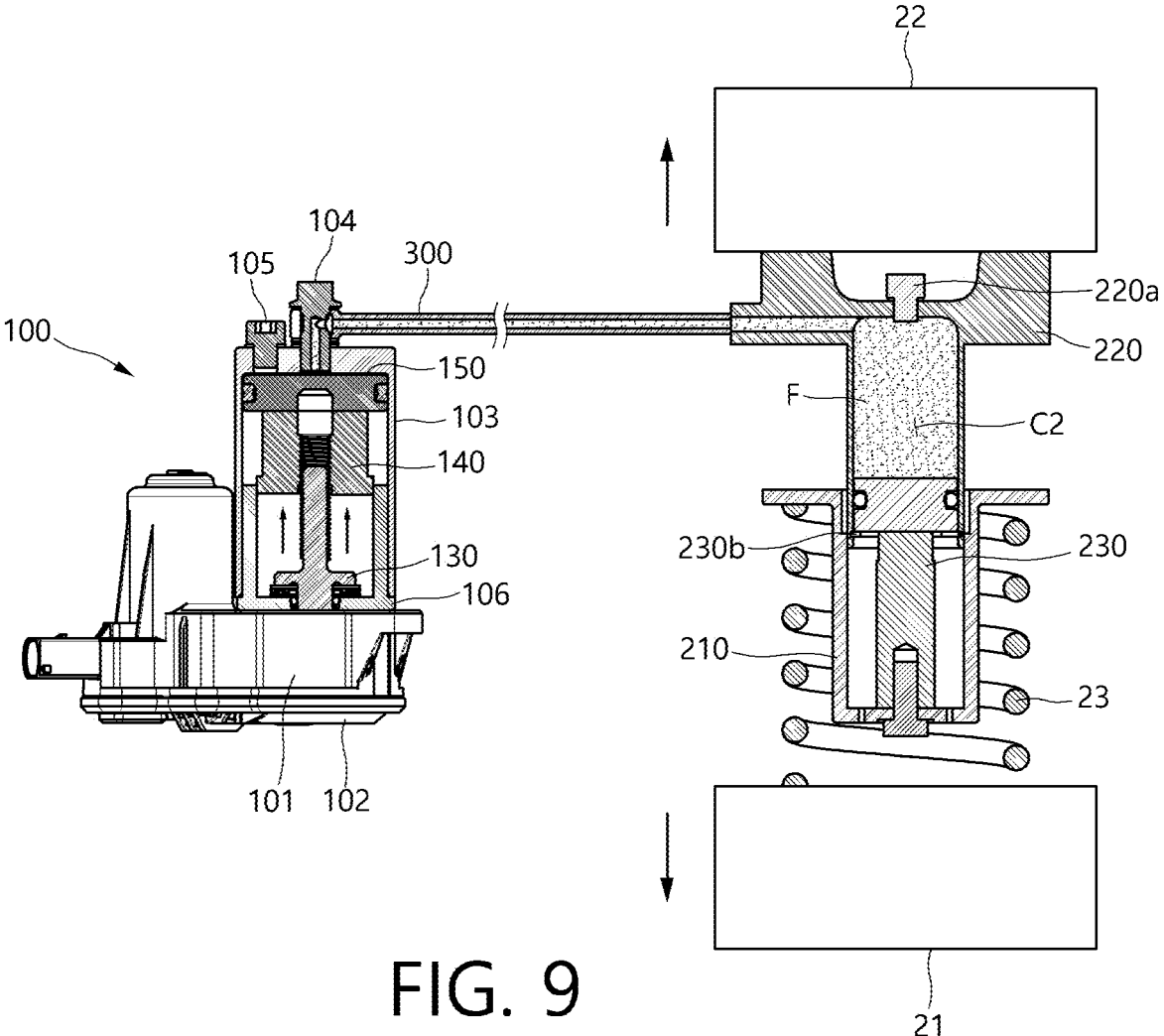
FIG. 9 is a view illustrating a state in which the apparatus for adjusting vehicle height raises the vehicle height according to an exemplary embodiment of the present disclosure.

Referring to FIGS. 8 and 9, when the fluid F is supplied into the actuating chamber C2, the volume of the actuating chamber C2 increases due to the fluid F, and the inner tube 220 is drawn outward from the outer tube 210.

More specifically, when the motor 110 of the pump 100 rotates in the forward direction, the spindle 130 rotates in the forward direction, and accordingly, the spindle nut 140 and the piston 150 move forward, thereby pressurizing the fluid F disposed inside the pump chamber C1 toward the hydraulic line 300. In addition, the pressurized fluid is introduced into the actuating chamber C2 of the actuator 200 through the hydraulic line 300.

As a result, the volume of the actuating chamber C2 increases, and the inner tube 220 is drawn outward from the outer tube 210 by the pressure of the fluid F introduced into the actuating chamber C2. Accordingly, the distance between the chassis 21 and the vehicle body 22 increases. In other words, the height of the vehicle increases.

When the rotation of the motor 110 of the pump 100 stops in the state where the vehicle height has increased, the spindle 130 and the spindle nut 140 engage with each other at the corresponding position, thereby achieving locking. Accordingly, the increased vehicle height can be maintained.

Meanwhile, when the fluid F flows from the actuating chamber C2 toward the pump 100, the volume of the actuating chamber C2 decreases, and the inner tube 220 is inserted into the inner side of the outer tube 210.

More specifically, in a state where the vehicle height is increased relative to the minimum height, when the motor 110 of the pump 100 rotates in the reverse direction, the spindle 130 rotates in the reverse direction, thereby releasing the locking between the spindle 130 and the spindle nut 140, and the spindle nut 140 and the piston 150 move backward.

Accordingly, the volume of the pump chamber C1 increases, and the volume of the actuating chamber C2 decreases as the inner tube 220 is inserted into the outer tube 210 by the weight of the vehicle body 22. As a result, the fluid F disposed inside the actuating chamber C2 flows into the pump chamber C1 through the hydraulic line 300, which in turn decreases the distance between the chassis 21 and the vehicle body 22. In other words, the height of the vehicle decreases.

With the above configuration, the apparatus for adjusting vehicle height according to the present disclosure has a simple hydraulic transmission structure using a motor and a piston, thereby efficiently achieving adjustment of the vehicle height.

The apparatus for adjusting vehicle height according to the present disclosure provides a high degree of freedom in installation within the vehicle through a structure in which the pump and the actuator can be arranged separately from each other.

It should be understood that the effects of the present disclosure are not limited to the above-described effects, and include all effects inferable from a configuration of the invention described in detailed descriptions or claims of the present disclosure.

Although embodiments of the present disclosure have been described, the spirit of the present disclosure is not limited by the embodiments presented in the specification. Those skilled in the art who understand the spirit of the present disclosure will be able to easily suggest other embodiments by adding, changing, deleting, or adding components within the scope of the same spirit, but this will also be included within the scope of the spirit of the present disclosure.

What is claimed is:

1. An apparatus for adjusting vehicle height, comprising:
a pump configured to supply or recover a fluid; and
an actuator mounted between a chassis and a vehicle body
    of a vehicle, the actuator being configured to receive
    the fluid from the pump to raise the vehicle body and
    increase the vehicle height, or to lower the vehicle body
    and decrease the vehicle height as the fluid is recovered
    by the pump,
wherein the pump comprises:

a motor configured to rotate in a forward or reverse direction;

a spindle configured to rotate in the forward or reverse direction according to the forward or reverse rotation of the motor;

a spindle nut through which the spindle is coupled, the spindle nut being configured to move forward when the spindle rotates in the forward direction and to move backward when the spindle rotates in the reverse direction; and a piston mounted in contact with the spindle nut and configured to move forward or backward together with the spindle nut.

2. The apparatus for adjusting vehicle height of claim 1, further comprising a hydraulic line connecting the pump and the actuator, the hydraulic line being configured to allow the fluid to flow between the pump and the actuator.

3. The apparatus for adjusting vehicle height of claim 1, wherein the piston supplies the fluid to the actuator while moving forward, and recovers the fluid into the pump while moving backward.

4. The apparatus for adjusting vehicle height of claim 1, wherein an output shaft of the motor and a forward/backward direction of the piston are arranged in parallel with each other.

5. The apparatus for adjusting vehicle height of claim 1, wherein the pump further comprises:

a main housing in which the motor is mounted; and a pump chamber housing in which the piston is disposed, the pump chamber housing defining a pump chamber configured to accommodate the fluid and being coupled to the main housing.

6. The apparatus for adjusting vehicle height of claim 5, wherein the pump chamber housing comprises a pump chamber housing body that defines the pump chamber, and a pump chamber housing extension protruding outward from an outer surface of the pump chamber housing body, and wherein the main housing and the pump chamber housing are coupled to each other by a fastening member inserted into the pump chamber housing extension through the main housing.

7. The apparatus for adjusting vehicle height of claim 5, wherein the pump further comprises an insert housing coupled to the main housing, the insert housing being disposed in contact with an outer surface of the spindle nut inside the pump chamber housing, and configured to define a backward movement limit of the piston by contacting one surface of the piston at a maximum backward position of the spindle nut.

8. The apparatus for adjusting vehicle height of claim 7, wherein the insert housing comprises a cylindrical insert housing body inserted into the pump chamber housing, and an insert housing extension protruding outward from an outer surface of the insert housing body and disposed outside the pump chamber housing, and wherein the main housing and the insert housing are coupled to each other by a fastening member inserted into the insert housing through the main housing.

9. An apparatus for adjusting vehicle height, comprising:

a pump configured to supply or recover a fluid; and an actuator mounted between a chassis and a vehicle body of a vehicle, the actuator being configured to receive the fluid from the pump to raise the vehicle body and increase the vehicle height, or to lower the vehicle body and decrease the vehicle height as the fluid is recovered by the pump, wherein the actuator comprises:

an outer tube having one open end;

an inner tube inserted into the outer tube through the open end of the outer tube; and a fixed piston fixed to the outer tube and disposed inside the inner tube, the fixed piston and an inner wall of the inner tube together defining an actuating chamber.

10. The apparatus for adjusting vehicle height of claim 9, wherein, when the fluid is supplied into the actuating chamber, the volume of the actuating chamber increases due to the fluid, and the inner tube is drawn outward from the outer tube to increase the vehicle height; and when the fluid flows from the actuating chamber toward the pump, the volume of the actuating chamber decreases, and the inner tube is inserted into the outer tube to decrease the vehicle height.

11. The apparatus for adjusting vehicle height of claim 9, wherein the fixed piston comprises:

a fixed piston head having an outer diameter corresponding to an inner diameter of the actuating chamber and disposed in contact with an inner wall of the inner tube; and a fixed piston body having a smaller outer diameter than the fixed piston head, the fixed piston body being connected to the fixed piston head, extending inside the inner tube, and fixed to the outer tube.

12. The apparatus for adjusting vehicle height of claim 11, wherein an inner tube groove is recessed in the inner circumferential surface of the inner tube, and the apparatus further comprises an inner tube stopper inserted into the inner tube groove, the inner tube stopper being configured to be caught by the fixed piston head when the inner tube is drawn outward from the outer tube, thereby defining a withdrawal limit of the inner tube.

13. The apparatus for adjusting vehicle height of claim 9, wherein the inner tube comprises:

a tubular inner tube body inserted into an inner side of the outer tube, and an inner tube flange extending radially outward from one end of the inner tube body, the inner tube flange being configured to contact the outer tube when the inner tube is inserted into the outer tube, thereby defining an insertion limit of the inner tube.

14. The apparatus for adjusting vehicle height of claim 13, wherein an inner tube inlet/outlet passage is formed in the inner tube flange to allow communication between an interior of the inner tube body and the pump.

15. The apparatus for adjusting vehicle height of claim 9, wherein the outer tube comprises an outer tube body having one open end into which the inner tube is inserted, and an outer tube flange extending radially outward from one end of the outer tube body.

16. The apparatus for adjusting vehicle height of claim 9, wherein an outer tube groove is recessed in the inner circumferential surface of the outer tube, and the apparatus further comprises a reinforcement member inserted into the outer tube groove, the reinforcement member being configured to guide movement of the inner tube within the outer tube and to provide resistance to lateral external forces.

17. The apparatus for adjusting vehicle height of claim 16, wherein the reinforcement member has a ring shape.

18. An apparatus for adjusting vehicle height, comprising:

a pump comprising a bidirectionally rotatable motor and a piston configured to move forward or backward within a pump chamber according to rotation of the motor, the piston being configured to pressurize fluid disposed in the pump chamber toward the outside or to draw fluid from the outside into the pump chamber; and an actuator mounted between a chassis and a vehicle body of a vehicle, the actuator being configured to receive the fluid from the pump to raise the vehicle body and increase the vehicle height, or to lower the vehicle body and decrease the vehicle height as the fluid is recovered by the pump, wherein the actuator comprises:

an outer tube having one open end;

an inner tube inserted into the outer tube through the open end of the outer tube; and a fixed piston fixed to the outer tube and disposed inside the inner tube, the fixed piston and an inner wall of the inner tube together defining an actuating chamber.

19. The apparatus for adjusting vehicle height of claim 18, wherein an output shaft of the motor and a forward/backward direction of the piston are arranged in parallel with each other.

* * * * *